(12) United States Patent
Park

(10) Patent No.: US 6,637,988 B1
(45) Date of Patent: Oct. 28, 2003

(54) ADJUSTABLE POCKET DRILLING FIXTURE

(76) Inventor: Joon Park, 1320 Virginia Ave., Glendale, CA (US) 91202

( * ) Notice: Subject to any disclaimer, the term of this patent is extended or adjusted under 35 U.S.C. 154(b) by 132 days.

(21) Appl. No.: 10/001,774

(22) Filed: Nov. 15, 2001

(51) Int. Cl.[7] .............................................. B23B 49/00
(52) U.S. Cl. ................................ 408/103; 408/115 R
(58) Field of Search ...................... 408/97, 103, 115 R

(56) References Cited

U.S. PATENT DOCUMENTS

| | | | | |
|---|---|---|---|---|
| 1,128,970 A | * | 2/1915 | Godefroy et al. .............. | 408/97 |
| 1,401,262 A | * | 12/1921 | Kranz .......................... | 408/97 |
| 1,919,900 A | * | 7/1933 | Moller ........................ | 408/95 |
| 2,519,468 A | * | 8/1950 | Hengst ........................ | 408/97 |
| 4,955,766 A | * | 9/1990 | Sommerfeld ................. | 408/87 |
| 5,676,500 A | * | 10/1997 | Sommerfeld ................. | 408/103 |
| 5,791,835 A | * | 8/1998 | Chiang et al. ............. | 408/115 R |
| 6,254,320 B1 | * | 7/2001 | Weinstein et al. .......... | 408/103 |
| 6,394,712 B1 | * | 5/2002 | Weinstein et al. .......... | 408/103 |
| 6,481,937 B1 | * | 11/2002 | Sommerfeld et al. ...... | 408/115 R |
| 2001/0036389 A1 | * | 11/2001 | Park ........................... | 408/103 |

* cited by examiner

Primary Examiner—Daniel W. Howell
(74) Attorney, Agent, or Firm—Allen A. Dicke, Jr.

(57) ABSTRACT

The pocket drilling fixture has a clamp base with a clamp face thereon. Opposing it is a clamp body with an opposing clamp face. Clamp structure, including a clamp arm on the base urges the faces together to clamp over a workpiece therebetween in a clamping direction. A guide carrier is mounted on the base to move in the direction at a right angle to the clamping direction. The base has a turret thereon with stops which can be positioned beneath the guide carrier to set its height above the base so that height can be preselected, depending on the workpiece thickness.

21 Claims, 3 Drawing Sheets

ADJUSTABLE POCKET DRILLING FIXTURE

FIELD OF THE INVENTION

This invention is directed to a fixture which permits pocket drilling in wood workpieces in various setups.

BACKGROUND OF THE INVENTION

Two wood workpieces are sometimes fastened together by means of a pocket joint. A pocket joint is a pocket hole in the first piece, with a screw in the pocket hole extending into the second workpiece. A pocket hole is one that is made at an angle in a first piece of wood, entering from the side and exiting put of the edge. Usually, the pocket is sufficiently large to fully contain the head of the screw so that, when the screw is recessed in the hole, it is not exposed.

SUMMARY OF THE INVENTION

In order to aid in the understanding of this invention, it can be stated in essentially summary form that it is directed to a pocket drilling hole fixture which has a base. The base carries a first clamp face. Movably mounted with respect to the base is a clamp jaw with a second clamp face. The actuator to draw the clamp jaw toward the first clamp face on the base is mounted on the base. Also mounted on the base is a drill guide carrier. The drill guide carrier has a drill guide hole. The drill guide carrier is adjustably mounted with respect to the base so that it can be moved to selected positions with respect to the base.

It is thus a purpose and advantage of this invention to provide a movably adjustable pocket drilling fixture which has both the clamp actuator and the pocket drilling guide hole on the same side of the fixture so that the user can apply the adjustable pocket drilling fixture to a workpiece and both clamp and drill from the same side of the workpiece.

It is another purpose and advantage of this invention to provide a movably adjustable pocket drilling fixture which can be quickly and easily applied to the edge of a workpiece for the accurate drilling of a pocket hole.

It is another purpose and advantage of this invention to provide a movably adjustable pocket drilling fixture wherein the position of the drill guide carrier can be selectively positioned with respect to the base of the pocket drilling fixture so as to permit the pocket hole to be drilled at different selected heights, but at the same angle so as to enable selection of the position at the bottom edge of the workpiece in which the pocket hole will exit.

It is another purpose and advantage of this invention to provide a movably adjustable drill guide carrier so that the position in which the angular pocket hole is drilled in the side of the workpiece can be selected from discrete positions so as to select a position at which the hole is drilled for different thickness of the workpiece.

Other purposes and advantages of this invention will become apparent from a study of the following portion of the specification, the claims and the attached drawings.

DESCRIPTION OF THE PREFERRED EMBODIMENTS

Figure 2:
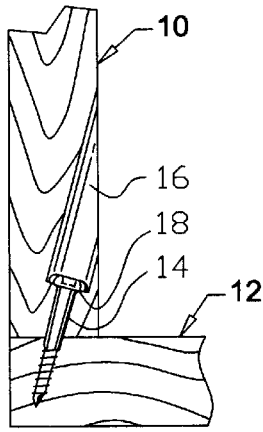
FIG. 2 is a section through first and second wood workpieces wherein the workpieces are joined by a wood screw in a pocket hole in the first workpiece and showing the height of the pocket hole on the side of the first workpiece which is of nominal ¾ inch thickness.

FIG. 2 shows a first workpiece 10 which is to be fastened to the second workpiece 12 in the present example. This fastening is to be accomplished by means of a wood screw 14 which is installed in pocket 16. The pocket 16 has a larger diameter where it enters into the side wall of the first workpiece 10. The larger diameter is sufficient to receive the head 18 of the wood screw 14.

Figure 3:
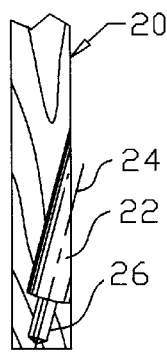
FIG. 3 is a section through a first workpiece at the point at which a pocket hole is drilled, showing the lower entry of the pocket hole for a first workpiece of lesser nominal thickness; for example, ½ inch.

The pocket hole 16 also has an axially aligned smaller hole which receives the shank of the wood screw. When the wood screw is installed in the pocket, it exits out of the bottom edge of the first workpiece 10 and is screwed into the second workpiece 12. It is conventional to drill such pockets at 15 degrees with respect to the side surface of the first workpiece 10. As an illustration, the thickness of the workpiece 10 in the transverse direction of the sheet is ¾ inch. The criteria for drilling a pocket hole include the following requirements. The pocket hole 16 which accepts the head of the wood screw should be fully into the workpiece so that the screw head does not extend beyond the surface of the workpiece. In addition, the pocket hole must be sufficiently high so that the screw head has enough material to engage to provide a firm joint. Furthermore, the pilot drill hole 26 must be fully in the workpiece so that the screw shank is not exposed. When the workpiece is not as thick (for example, ½ inch in thickness), the center line of the drilled pocket hole must come out further to the other side of workpiece 20 than the face of the wood into which the pocket hole 22 is drilled. To accomplish this, the entry of the drilled pocket hole is closer to the lower end of the workpiece. This is illustrated in FIG. 3 where the workpiece 20 is shown as being ½ inch thick. Pocket hole 22 is illustrated as being started high enough on the workpiece so that the axis 24 of the pocket drill bit exits the lower edge of the workpiece and the pocket hole can fully receive the head of the screw. In FIG. 3, the pilot drill hole 26 is also seen. Thus, with the drill axis fixed at 15 degrees, the entry height is suitably adjusted to accomplish the goals of fully receiving the head while exiting out of the lower edge of the workpiece.

Figure 4:
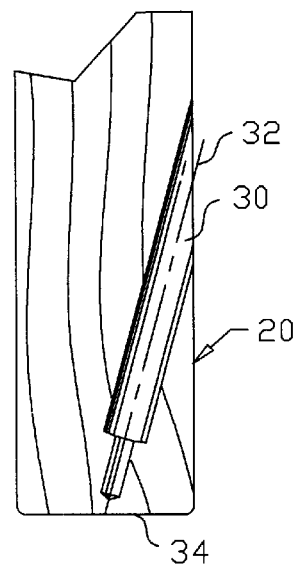
FIG. 4 is similar to FIG. 2, but showing the position of entry of the pocket hole in a first workpiece having a nominal 1½ inch thickness.

In FIG. 4, the workpiece 28 is scaled to be 1½ inches thick. The pocket 30 is started high enough on the side of the workpiece so that the drill axis 32 intersects the bottom edge surface 34 substantially at its mid-point, similarly to that shown in FIG. 2. By this adjustment, a suitably designed pocket drilling fixture can be positioned so that the pocket drill axis intersects the bottom surface, the drill pocket fully accepts the screw head and there is sufficient material below the drill pocket so that the screw can strongly attach the workpiece with the drill pocket therein. These requirements must also be balanced with the height of the entry point of the pocket drill hole and the side of the workpiece.

Figure 5:
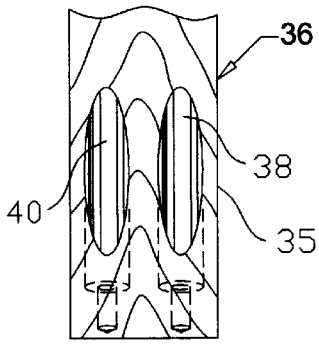
FIG. 5 is a front view of a first workpiece showing two pocket holes drilled adjacent each other.

On some occasions, it is desirable to drill a plurality of pocket holes for fastening with a plurality of screws. The workpiece 36 shown in FIG. 5 is seen from the side into which first and second pocket holes 38 and 40 are drilled parallel to each other. The distance between the plurality of pocket holes can vary depending upon the width of the workpiece into which they are drilled.

Figure 1:
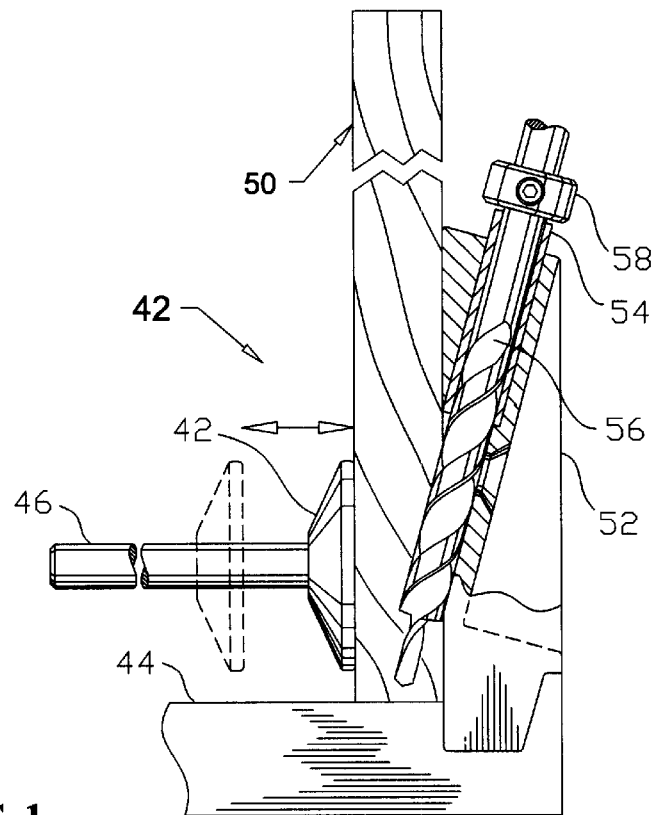
FIG. 1 is a side-elevational view of one example of the prior art, with parts broken away substantially on a section line through the axis of the drill guide.

FIG. 1 shows a prior art pocket drilling fixture 42 which has a clamp portion 44 on which is mounted a piston 46 which carries a foot 48 which engages against the workpiece 50. The piston has a mounting bracket and a lever to press the workpiece to the right. Mounted on the clamp portion 44 is guide portion 52. The workpiece 50 is clamped against the guide portion 52. The guide portion includes a drill guide channel 54. A drill 56 is introduced through the drill guide channel to drill the pocket hole in the workpiece 50. A stop collar 58 stops the advance of the drill at a point determined by the positioning of the stop collar.

One of the problems of this prior art structure is that the clamping is on one side of the workpiece and the drilling is on the other. When the workpiece is large, the artisan must walk around the workpiece to perform the two different functions of clamping and drilling. This complicates the drilling of suitable pockets and leads to unnecessary waste of time.

Figure 6:
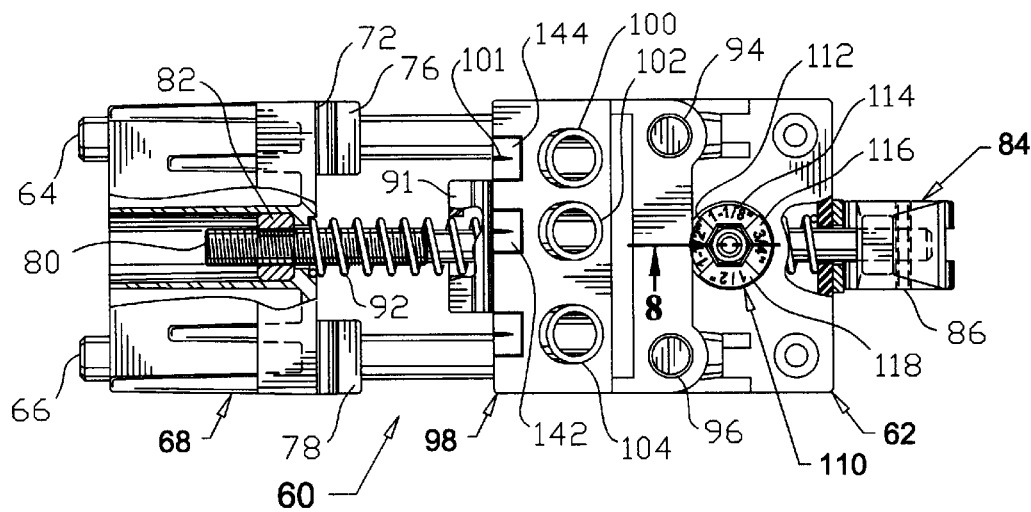
FIG. 6 is a plan view of the adjustable pocket drilling fixture of this invention.
Figure 7:
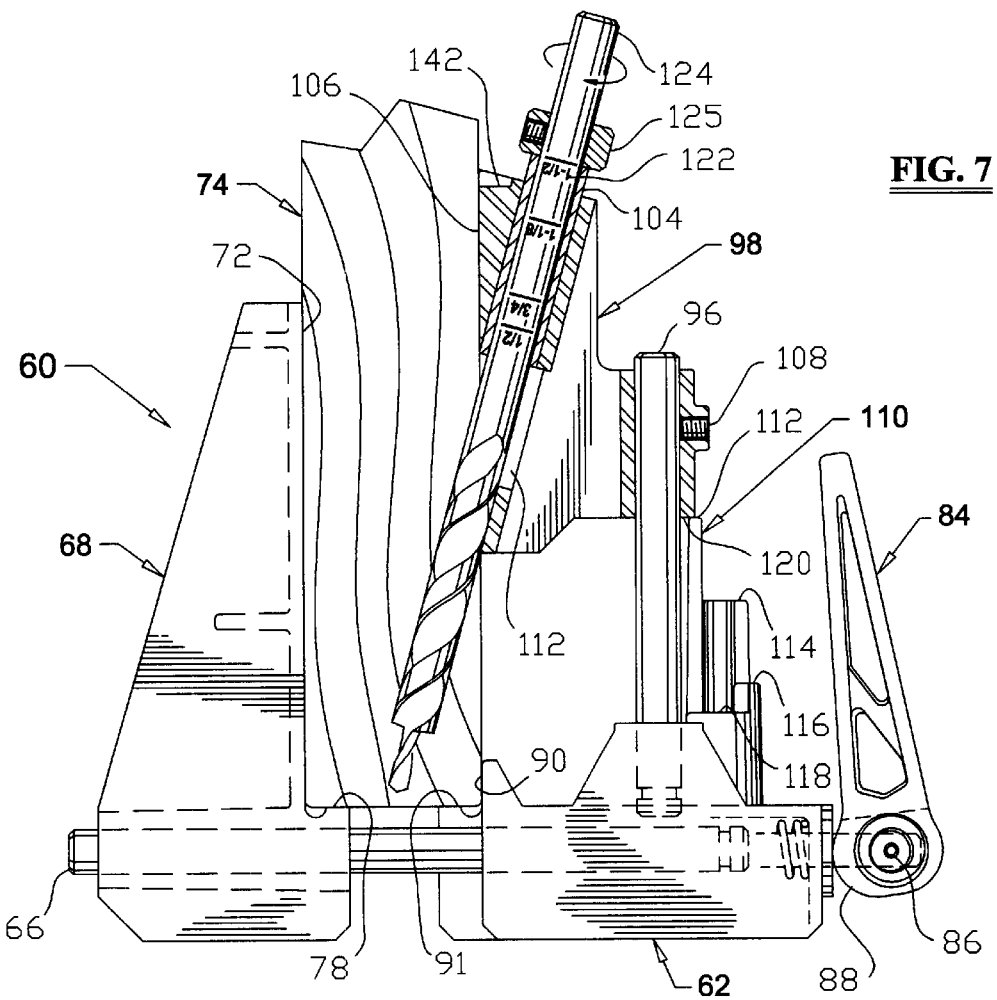
FIG. 7 is a side-elevational view thereof, with parts broken away substantially along the center line of one of the drill guides.

The adjustable pocket drilling fixture 60 of this invention is shown in FIGS. 6 and 7. The fixture 60 has a base 62. Extending from the base are two guide bars 64 and 66. The guide bars are of uniform cross section and are illustrated as being cylindrical. The guide bars are secured in base 62 with their axes parallel.

Clamp body 68 has two holes therethrough which closely fit the guide bars 64 and 66, and the clamp body slides on the guide bars parallel to their axes. The clamp jaw is unitarily formed with the clamp body and extends upward from the guide bars. It has a clamp face 72 which can engage against the workpiece 74. The clamp face 72 is at a right angle with respect to the plane defined by the axes of guide bars 64 and 66. The clamp body 68 also has feet 76 and 78 formed thereon just above the openings for the guide bars. These feet act as stops against which the workpiece 74 engages.

The clamp body 68 is urged toward the base 62 by means of a clamp screw 80, which engages in a threaded nut 82 positioned in the clamp body 68 between the guide holes through the clamp body. The nut 82 and screw 80 preferably lie in the same plane as the guide bars 64 and 66. At the right end, the clamp arm 84 is pivoted on the screw 80 by means of cross pivot pin 86. The cam 88 of the clamp arm 84 has a larger radius toward the base 62 when the clamp arm 84 is in the raised position shown in FIG. 7. Thus, when the clamp arm is raised from the horizontal position to the raised position of FIG. 7, the screw 80 is pulled to the right. This moves clamp body 68 to the right.

Base 62 has a clamp face 90 thereon against which the workpiece 74 is thrust when the clamp is engaged. Base 62 also has a foot 91 upon which the edge of the workpiece rests. Adjustment of the clamp to accommodate different thicknesses of workpiece can be accomplished by rotating the clamp arm 84 down to the horizontal position and rotating the handle and screw 80 until the correct adjustment is achieved. Compression spring 92 urges the clamp body 68 left to the disengaged position when the clamp arm 84 is released.

First and second upright guide bars 94 and 96 are mounted in base 62, and these bars are positioned at a right angle to the guide bars 64 and 66. Guide bars 94 and 96 are parallel and of uniform cross section to serve as upright guides for guide carrier 98. The guide carrier 98 supports thereon three drill guide bushings 100, 102 and 104. The reference indicia 101, 103 and 105 are respectively placed in line with the axes of the drill guide bushings 100, 102 and 104, respectively. The placement of the drill guide bushings and indicia at different spacings permit the artisan to drill two pocket openings on the same setup and to choose between three different spacings between the two drill pocket holes.

As seen in FIG. 7, the drill guide bushings are at the usual angle of 15 degrees with respect to the vertical when the vertical is defined by the upright guide bars 94 and 96, and horizontal is defined by the guide bars 64 and 66. The guide carrier 98 has a clamp face 106 thereon which also engages against the workpiece 74 to hold it in place in the clamped position between the clamp faces. As seen in FIG. 7, guide carrier 98 has a chip opening 126 which permits the chips to clear during the drilling operation.

The guide carrier is movable up and down with upright guide bars 94 and 96. It can be secured at any selected position by tightening of the set screw 108 seen in FIG. 7. Height can be established by means of a turret 110 which is rotatably mounted on the base 62 over the clamp screw 80 and just to the right of guide carrier 98. The turret 110 has four different height sections with the first and highest having a top surface 112, a second height section having a height surface 114, a third height having a top surface 116, and the lowest step having a top surface 118. The turret can be rotated so that any one of these surfaces can engage under the bottom surface 120 of the guide carrier 98.

While the guide carrier can be adjusted to any desired height on its upright guide bars 94 and 96, the turret provides a way to set the height for particular thickness of the workpiece. For example, the lowest step 118 on the turret is suitable for a workpiece which is ½ inch thick. This permits the proper positioning of the guide carrier to drill the pocket hole in a position, as described above. The height of surface 116 is suitable for a workpiece which is ¾ inch thick, and the height of the turret step 114 is suitable for a workpiece which is 1⅛ inches thick. Similarly the height of the turret section 112 is suitable for a workpiece which is 1½ inches thick. This presets the guide carrier height suitably to pocket-drill a workpiece of that thickness and come out at a suitable position at the edge of the workpiece. Thus, accurate setup height is quickly and easily achieved.

Figure 8:
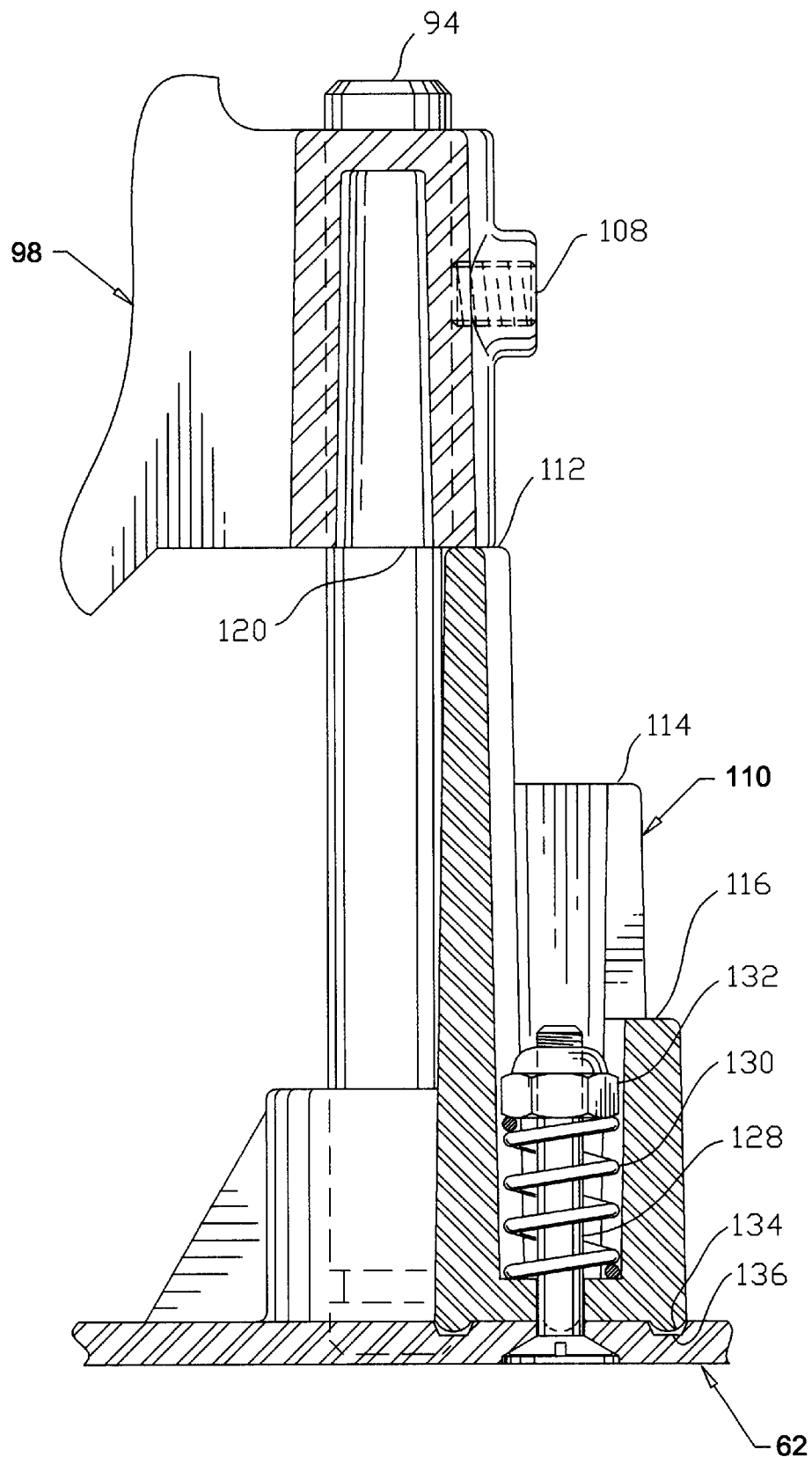
FIG. 8 is an enlarged section taken generally along the line 8—8 of FIG. 6, showing the turret which establishes the guide carrier height.

FIG. 8 shows the turret 110 rotatably mounted on the base 62. The turret rotates on shaft 128 and is held down onto the base by means of a compression spring 130, which is held in place by a nut 132. A detent mechanism comprises at least one bump 134 which extends into a recess 136. There are four such recesses 90 degrees apart, each corresponding to a position of a turret surface under the bottom surface 120 of the guide carrier 98.

When a workpiece 74 is to receive one or more pocket drill holes, the thickness of the workpiece is noted. Set screw 108 is loosened, and guide carrier 98 is raised. Turret 110 is rotated until the corresponding turret height surface is under the stop surface 120 on the bottom of the guide carrier.

Rotation of the turret is easy because the spring 130 holds the detent bump down into the detent recess so that the turret can be raised and rotated. When the selected turret height is under the bottom surface on the guide carrier 98, the guide carrier is lowered and the set screw 108 is tightened for security. The workpiece 74 is put in place between the clamp faces 72 and 106 resting on the feet 76, 78 and 91. With the clamp arm 84 in the open, horizontal position, the arm is rotated on the axis of screw 80 until the clamp body 68 is almost clamped on the workpiece. Then the clamp arm is raised in the position shown in FIG. 7. This draws the screw 80 to the right by means of the cam action of cam surface 88 to clamp the workpiece 74 in place.

Next, the drill 124 is introduced into one or more of the drill guide bushings 100, 102 and/or 104. Whichever drill guide bushing is chosen is a function of the artisan's fastening needs. If two pocket drill holes are required, the artisan has a choice of three different spaces by choosing different pairs of the drill guide bushings. The rotating drill is introduced down through the drill guide bushings so that the workpiece is drilled. Chips are expelled from chip opening 126. Depth of drilling can be conveniently accomplished by observing the plural drill depth indicia 122 on the drill to control the depth of drilling as the pocket drilling is taking place.

If the artisan wants the pocket drill holes in particular places, he can scribe on the surface of the workpiece which lies against the guide carrier 98. He can then place the appropriate indicia 101, 103 or 105 at the scribe mark so that the pocket drill hole is properly positioned. These acts of positioning with respect to the guide marks, clamping and drilling are all accomplished at the same side of the workpiece 74. This is particularly important when the workpiece is large so that it is difficult to accomplish clamping and drilling functions if they are on opposite sides. When the pocket hole is drilled close to the end of the workpiece, it is important to know the relationship of the pocket hole to the workpiece. For this reason, in addition to the center line marking indicia 101, the position where the pocket holes will be drilled is shown by the indicia pockets 142 and 144, seen in FIG. 6. The width of the indicia pocket is equal to the pocket hole diameter. Further, FIG. 7 shows the indicia pockets as being recesses in the top surface of the guide carrier 98. With these indicia recesses visible, the artisan can make sure that the pocket hole will not intersect the end of the workpiece, but will be an adequate distance from it.

The depth of cutting is important because the pilot on the drill must reach or almost reach the bottom edge of the workpiece. The maximum amount of material between the shoulder on the drill and the bottom edge of the first workpiece is important for strength. It is also important that the pilot drill pocket be sufficiently deep so that it fully receives the head of the screw therein. Since the height of the drill carrier 98 is fixed by means of turret 110, the height of the drill guide bushing 104 is known. Thus, the depth of penetration can be regulated by marking a suitable indicia 122 on the drill 124. A suitable indicia is provided for each of the set heights of the guide carrier 98 which correspond to the settings of the turret 110. This kind of drill depth control is easier to use because no individual stop setting for each depth is required. Furthermore, it is more accurate for the same reason.

This invention has been described in its presently preferred best modes and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An adjustable pocket drilling fixture comprising:

a base, a clamping face on said base, said clamping face defining a plane;

a clamp body, a clamping face on said clamp body opposing said clamping face on said base;

clamping structure interengaging said clamp body and said base, said clamping structure including a clamp actuator positioned adjacent said base to move said clamp body in a clamping direction;

a guide carrier, at least one drill guide in said guide carrier, said drill guide having an axis which intersects said plane of said clamping face on said base, said guide carrier being slidably mounted on said base to move in a direction parallel to said plane; and gaging structure between said base and said guide carrier so that said guide carrier can be positioned at a predetermined distance from said base.

2. The adjustable pocket drilling fixture of claim 1 wherein said gaging structure has a plurality of surfaces thereon, said gaging structure being movable with respect to said base so that one of said gaging structures can be positioned to gage the height of said guide carrier above said base.

3. The adjustable pocket drilling fixture of claim 2 wherein said gaging structure is a turret.

4. The adjustable pocket drilling fixture of claim 3 wherein said turret is rotatably mounted on said base, said turret having a plurality of said gaging surfaces thereon and being configured so that a selected one of gaging surfaces can be positioned under said guide carrier to space said guide carrier a predetermined position above said base.

5. The adjustable pocket drilling fixture of claim 4 wherein there is a detent interengaging between said turret and said base so that said turret is detented in its selected position.

6. The adjustable pocket drilling fixture of claim 1 wherein there is at least one upright guide bar mounted on said base, said upright guide bar being at a right angle to said clamping direction, said guide carrier being mounted on said upright guide bar for movement to a selected position above said base.

7. The adjustable pocket drilling fixture of claim 6 wherein there are first and second of said upright guide bars, said first and second upright guide bars defining a plane which is parallel to said clamping face.

8. The adjustable pocket drilling fixture of claim 7 wherein said gaging structure has a plurality of surfaces thereon, said gaging structure being moving with respect to said base so that one of said gaging structures can be positioned to gage the height of said guide carrier above said base.

9. The adjustable pocket drilling fixture of claim 1 wherein first and second clamp guide bars are mounted on said base and said clamp body is slidably mounted on said clamp guide bars, said clamp guide bars defining a plane which is perpendicular to the plane of said clamping face.

10. The adjustable pocket drilling fixture of claim 9 wherein said clamping structure comprises a screw and a nut, said screw engaging in said nut, said clamp actuator being connected to rotate said screw with respect to said nut to adjust the distance between said clamp faces, said clamp actuator engaging with respect to said base so that it is on the same side of said clamp faces as said guide carrier.

11. The adjustable pocket drilling fixture of claim 10 wherein said clamp body has at least one foot thereon and said base has at least one foot thereon, said feet lying in the same plane which is substantially parallel to said clamp guide bars and parallel to the clamping direction.

12. An adjustable pocket drilling fixture comprising:

a base, a substantially planar clamping face on said base;

a clamp body, a clamping face on said body facing said clamp face on said base;

clamping structure interengaging said base and said clamp body to move said clamp body toward said base;

a guide carrier movably mounted on said base to move substantially parallel to said clamping faces;

measuring structure selectively positionable between said base and said guide carrier so that said guide carrier can be positioned a selected distance above said base so that the position of a pocket hole to be drilled in a workpiece engaged between said clamping faces can be selected.

13. The adjustable pocket drilling fixture of claim 12 wherein said measuring structure is a turret having a plurality of stops thereon, said turret being movably mounted to place a selected stop to position said guide carrier at a preselected height above said base.

14. The adjustable pocket drilling fixture of claim 13 wherein said turret is rotatably mounted on said base.

15. The adjustable pocket drilling fixture of claim 13 wherein there is an upright guide bar mounted on said base and said guide carrier is mounted on said guide bar so that the direction of motion of said guide carrier is controlled by said guide bar in a direction substantially parallel to said clamping face on said base.

16. The adjustable pocket drilling fixture of claim 15 wherein said upright guide bar is fixed in said base and said guide carrier is movably mounted thereon and there is a lock interengaging between said guide carrier and said guide bar to lock said guide carrier in a selected position with respect to said base.

17. The adjustable pocket drilling fixture of claim 14 wherein said measuring structure is a turret having a plurality of stops thereon, said turret being movably mounted to place a selected stop to position said guide carrier at a preselected height above said base.

18. The adjustable pocket drilling fixture of claim 12 wherein there is a plurality of drill guides in said guide carrier so that a plurality of pocket holes can be drilled at one setup.

19. The adjustable pocket drilling fixture of claim 12 wherein there is at least one drill guide in said drill guide carrier and there is indicia on said drill guide carrier showing the position of said drill guide.

20. The adjustable pocket drilling fixture of claim 12 wherein said clamp actuator is on the same side of said clamping face of said base as is said guide carrier so that clamping and drilling can be accomplished on the same side of the workpiece.

21. The adjustable pocket drilling fixture of claim 12 wherein there is at least one drill guide in said drill guide carrier and there is a pocket drill having drill depth indicia thereon so that depth of drilling can be controlled by relating the position of said drill with said drill guide.

* * * * *